US011259229B2

(12) United States Patent
Zhang et al.

(10) Patent No.: US 11,259,229 B2
(45) Date of Patent: Feb. 22, 2022

(54) APPARATUS AND METHOD OF SPEED BASED NETWORK SELECTION

(71) Applicant: MEDIATEK SINGAPORE PTE. LTD., Singapore (SG)

(72) Inventors: Jianwei Zhang, Beijing (CN); Yen-Chen Chen, Hsinchu (TW); Yuanyuan Zhang, Beijing (CN); Yih-Shen Chen, Hsinchu (TW); Chi-Yuan Peng, Hsinchu (TW)

(73) Assignee: MEDIATEK SINGAPORE PTE. LTD., Singapore (SG)

(*) Notice: Subject to any disclaimer, the term of this patent is extended or adjusted under 35 U.S.C. 154(b) by 57 days.

(21) Appl. No.: 16/614,077

(22) PCT Filed: May 15, 2018

(86) PCT No.: PCT/CN2018/086886
§ 371 (c)(1),
(2) Date: Nov. 15, 2019

(87) PCT Pub. No.: WO2018/210237
PCT Pub. Date: Nov. 22, 2018

(65) Prior Publication Data
US 2021/0160753 A1 May 27, 2021

(30) Foreign Application Priority Data
May 17, 2017 (CN) .......................... 201710347723.2

(51) Int. Cl.
*H04W 4/00* (2018.01)
*H04W 36/32* (2009.01)
(Continued)

(52) U.S. Cl.
CPC ........... *H04W 36/32* (2013.01); *H04W 24/10* (2013.01); *H04W 36/0085* (2018.08);
(Continued)

(58) Field of Classification Search
CPC . H04W 36/32; H04W 36/0085; H04W 24/10; H04W 36/14; H04W 36/30;
(Continued)

(56) References Cited

U.S. PATENT DOCUMENTS 5,396,645 A 3/1995 Huff
9,173,151 B2 * 10/2015 Choi ............... H04W 36/00837
(Continued)

FOREIGN PATENT DOCUMENTS

CN 102938917 A 2/2013
CN 103067312 A 4/2013
(Continued)

OTHER PUBLICATIONS

Extended European Search Report dated Oct. 30, 2020 in European Patent Application No. 18802830.2, 12 pages.
(Continued)

*Primary Examiner* — Amancio Gonzalez
(74) *Attorney, Agent, or Firm* — Oblon, McClelland, Maier & Neustadt, L.L.P.

(57) ABSTRACT

Aspects of the disclosure provide an electronic device. The electronic device can include transceiver circuitry and processing circuitry. The transceiver circuitry can be configured to receive signals from wireless service provider networks. The processing circuitry can be configured to detect, from the signals, a high speed rail (HSR) signature of one of the wireless service provider networks. The HSR signature can indicate that the one of the wireless service provider networks is a first network for a high speed rail usage. The processing circuitry can also be configured to determine a mobility of the electronic device based on the signals in a time duration. Further, the processing circuitry can be configured to selectively camp on a first cell of the first network based on the mobility of the electronic device.

21 Claims, 7 Drawing Sheets

(51) Int. Cl.

| | | |
|---|---|---|
| *H04W 36/00* | (2009.01) | |
| *H04W 24/10* | (2009.01) | |
| *H04W 36/14* | (2009.01) | |
| *H04W 36/30* | (2009.01) | |
| *H04W 48/18* | (2009.01) | |
| *H04W 88/06* | (2009.01) | |

(52) U.S. Cl.
CPC ........... *H04W 36/14* (2013.01); *H04W 36/30* (2013.01); *H04W 48/18* (2013.01); *H04W 88/06* (2013.01)

(58) Field of Classification Search
CPC ..... H04W 48/18; H04W 88/06; H04W 48/12; H04W 88/085; H04W 24/08
USPC .......................................................... 370/329
See application file for complete search history.

(56) References Cited

U.S. PATENT DOCUMENTS

| | | | | |
|---|---|---|---|---|
| 9,426,700 | B2* | 8/2016 | Hahn | ................. H04W 36/0058 |
| 9,668,191 | B2* | 5/2017 | Makh | ................. H04W 36/0094 |
| 9,807,666 | B2 | 10/2017 | Dang | |
| 10,349,265 | B2* | 7/2019 | Ly | ............................ H04W 8/08 |
| 2014/0337232 | A1* | 11/2014 | Glasgo | ................. G06Q 20/401 |
| | | | | 705/44 |
| 2015/0208314 | A1 | 7/2015 | Hernando | |
| 2016/0255564 | A1 | 9/2016 | Yang et al. | |
| 2018/0109344 | A1* | 4/2018 | Ly | ............................ H04J 11/00 |
| 2020/0236605 | A1* | 7/2020 | Yiu | ....................... H04W 36/24 |

FOREIGN PATENT DOCUMENTS

| | | |
|---|---|---|
| CN | 103188735 A | 7/2013 |
| CN | 103516637 A | 1/2014 |
| CN | 104170467 A | 11/2014 |
| CN | 102938917 B | 6/2015 |
| CN | 105142194 A | 12/2015 |
| CN | 105519153 A | 4/2016 |
| CN | 106332197 A | 1/2017 |
| EP | 3046274 A1 | 7/2016 |
| WO | WO 2014/032908 A2 | 3/2014 |
| WO | WO 2016/061734 A1 | 4/2016 |
| WO | WO 2016/137585 A1 | 9/2016 |

OTHER PUBLICATIONS

Combined Chinese Office Action and Search Report dated Jul. 17, 2020 in corresponding Chinese Patent Application No. 201880001752.6 (with English Translation of Category of Cited Documents), 9 pages.

International Search Report and Written Opinion dated Aug. 1, 2018 in PCT/CN2018/086886 filed on May 15, 2018.

Taiwanese Office Action dated Aug. 8, 2019 in CN 201710347723.2 filed May 17, 2017, (10 pages).

Indian Office Action dated Mar. 18, 2021 in Indian Patent Application No. 201927051076, 5 pages.

European Office Action dated Aug. 31, 2021 in European Patent Application No. 18802830.2, 9 pages.

* cited by examiner

APPARATUS AND METHOD OF SPEED BASED NETWORK SELECTION

INCORPORATION BY REFERENCE

This present disclosure claims priority to Chinese Patent Application No. 201710347723.2, entitled "APPARATUS AND METHOD OF SPEED BASED NETWORK SELECTION" filed with the Chinese Patent Office on May 17, 2017, which is incorporated herein by reference in its entirety.

TECHNICAL FIELD

The technical field of this disclosure is generally related to wireless communication technology, and more particularly, to speed based network selection.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

High speed rail operates significantly faster than traditional rail traffic. In an example, while traditional railway operates at an average of 60 miles per hour, the high speed rail can exceed 120 miles per hour. The high mobility of high speed rail challenges on-board mobile communication.

SUMMARY

Aspects of the disclosure provide an electronic device. The electronic device can include transceiver circuitry and processing circuitry. The transceiver circuitry can be configured to receive signals from wireless service provider networks. The processing circuitry can be configured to detect, from the signals, a high speed rail (HSR) signature of one of the wireless service provider networks. The HSR signature can indicate that the one of the wireless service provider networks is a first network for a high speed rail usage. The processing circuitry can also be configured to determine a mobility of the electronic device based on the signals in a time duration. Further, the processing circuitry can be configured to selectively camp on a first cell of the first network based on the mobility of the electronic device.

In some embodiments, the processing circuitry is further configured to extract, based on the signals, remote radio head (RRH) information associated with RRHs. Further, the processing circuitry can determine the mobility of the electronic device based on the RRH information. In addition, the processing circuitry is further configured to extract RRH indices of the respective RRHs based on the RRH information, and determine the mobility of the electronic device based on a change rate of the RRH indices in the time duration.

In some embodiments, the processing circuitry is further configured to detect, from the signals, that another one of the wireless service provider networks is for a normal public usage. Further, the processing circuitry can camp on the first cell of the first network when the mobility of the electronic device satisfies a preset mobility condition, and camp on a second cell of a second network when the mobility of the electronic device fails to satisfy the preset mobility condition, the second network being the another one of the wireless service provider networks.

In some embodiments, the processing circuitry is further configured to determine characteristics of the first cell based on the signals, the characteristics including one or a combination of: reference signal received power, reference signal received quality, a carrier frequency, and a radio access technology. Further, the processing circuitry can enable the electronic device to camp on the first cell when the mobility of the electronic device and the characteristics satisfy a preset selection condition.

In an embodiment, the processing circuitry is configured to send, via the transceiver circuitry, the mobility of the electronic device to the wireless service provider networks.

Aspects of the disclosure provide a method. The method includes receiving, by transceiver circuitry of an electronic device, signals from wireless service provider networks. The method also includes detect, by processing circuitry of the electronic device, a high speed rail (HSR) signature of one of the wireless service provider networks from the signals. The HSR signature indicates that the one of the wireless service provider networks is a first network for a high speed rail usage. The method also includes determining a mobility of the electronic device in a time duration, and selectively camp on a first cell of the first network based on the mobility of the electronic device.

Aspects of the disclosure provide a method. The method includes receiving, by an apparatus of a serving cell in a wireless service provider network that serves an electronic device, first signals from the electronic device. The method also includes detecting a high speed rail (HSR) signature of a neighboring cell and determining a mobility of the electronic device. Further, the method includes selectively initializing a handover of the electronic device from the serving cell to the neighboring cell based on the mobility of the electronic device.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
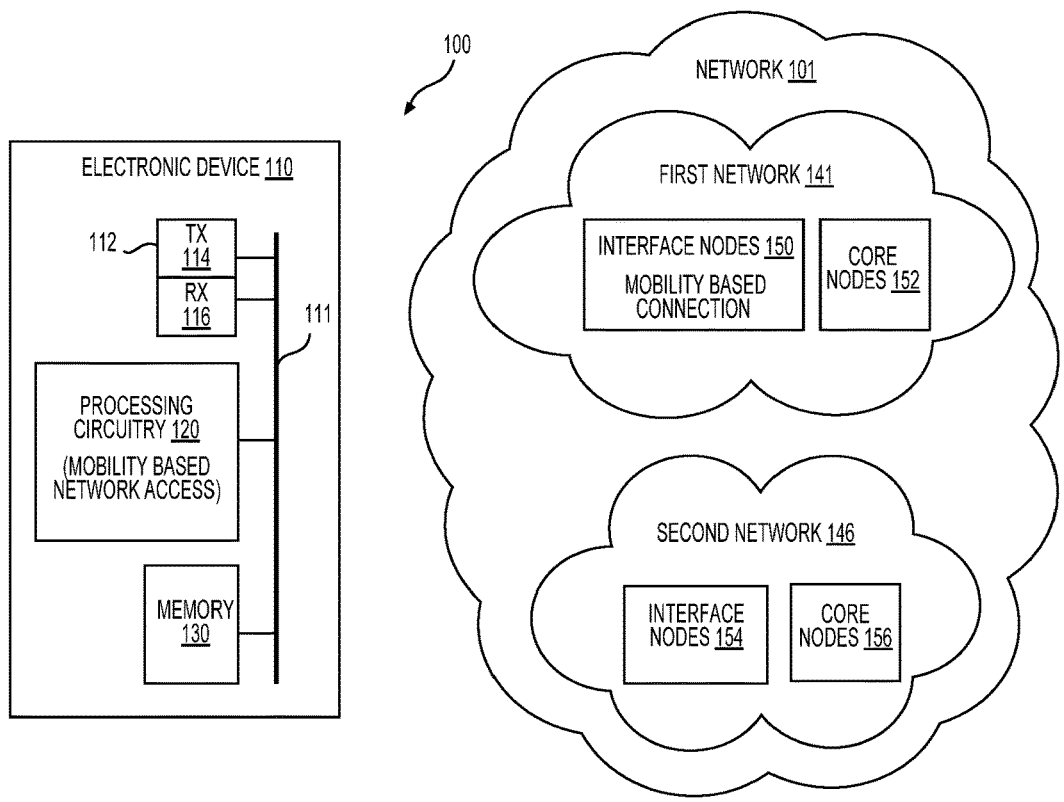
FIG. 1 shows a block diagram of a communication system 100 according to an embodiment of the disclosure.

FIG. 1 shows a block diagram of a communication system 100 according to an embodiment of the disclosure. The communication system 100 includes a network 101 and an electronic device 110 that receives wireless communication service from the network 101. The network 101 can include wireless communication service providers corresponding to certain network types, such as a first wireless communication service provider 141 (referred to as a first network 141) to provide wireless communication service for a high speed rail usage, and a second wireless communication service provider 146 (referred to as a second network 146) to provide wireless communication service for a normal public usage as shown in FIG. 1. According to aspects of the disclosure, the electronic device 110 can be configured to determine mobility information of the electronic device 110, and select the first network 141 to camp on based on the mobility information. The mobility information can be represented, for example as a speed, speed information, mobility status (e.g., a high speed and a low speed), and the like. Further, when the electronic device 110 is connected to a serving cell in the first network 141, the first network 141 can be configured to determine a neighboring cell of the serving cell and initialize switching the electronic device 110 from the serving cell to the neighboring cell based on the mobility information. Therefore, when the electronic device 110 has a high speed, for example, on a high speed train, the electronic device 110 can receive wireless communication service from the first network 141. When the electronic device 110 has a low speed, for example off a high speed train, the electronic device 110 can receive wireless communication service from the second network 146.

The network 101 includes interconnections that are implemented using any suitable network technology, such as wired, wireless, a cellular communication technology, a local area network (LAN), a wireless LAN (WLAN), a fiber optical network, a wide area network (WAN), a peer-to-peer network, the Internet, and the like.

The first network 141 and the second network 146 can provide wireless communication service using any suitable wireless communication technology, such as second generation (2G) mobile network technology, third generation (3G) mobile network technology, fourth generation (4G) mobile network technology, fifth generation (5G) mobile network technology, global system for mobile communication (GSM), long-term evolution (LTE), new radio (NR) technology, and the like.

In an example, a wireless communication service provider in the network 101 is a facility-based provider that owns the mobile infrastructure, such as cell towers and network components that form a backbone to manage and control the services provided by the wireless communication service provider. In another example, a wireless communication service provider in the network 101 is a mobile virtual network operator that does not own a mobile infrastructure, but leases telephone and data service from facility-based providers.

In an embodiment, each wireless communication service provider includes a plurality of nodes that are coupled together by any suitable network technology, such as wired, wireless, fiber optical network, and the like. In the FIG. 1 example, the first network 141 includes one or more interface nodes 150 and one or more core nodes 152, and the second network 146 includes one or more interface nodes 154 and one or more core nodes 156. In an example, an interface node 150 in the first network 141 and an interface node 154 in the second network 146 can communicate directly. In another example, an interface node 150 and an interface node 154 do not directly communicate but can communicate via for example, the core nodes 152 and/or the core nodes 156.

In an example, an interface node 154 can be an access point, an access terminal, a base transceiver station (a base station), a Node B, an evolved Node B, a next generation Node B (gNB), and the like. In an example, an interface node 154 can include remote radio heads (RRHs). The interface node 154 includes hardware components and software components configured to enable wireless communications between the interface node 154 and electronic devices, such as the electronic device 110, and the like that have subscribed services provided by the second network 146. Further, in the example, the core nodes 156 include hardware components and software components to form a backbone to manage and control the services provided by the second network 146.

In an example, an interface node 150 can be an access point, an access terminal, an evolved Node B, a gNB, a base transceiver station (base station), a Node B, and the like. In an example, an interface node 150 can include RRHs. The interface node 150 includes hardware components and software components configured to enable wireless communications between the interface node 150 and electronic devices, such as the electronic device 110, and the like. In the example, cell towers of the interface node 150 are located along tracks of high speed rail, such that the cell towers provide radio coverage over the tracks. Further, in an example, the core nodes 152 include hardware components and software components to form a backbone to manage and control the service provided by the first network 141.

In some embodiments, an interface node, such as an interface node 150, an interface node 154 and the like, provides radio coverage over a physical area. The physical area with the radio coverage by the interface node can be referred to as a cell. In an embodiment, a cell has a cell identifier (ID) that identifies the cell from other cells in a same wireless communication network provider. In the following description, a cell served by the interface node 150 is referred to as a first cell in the first network 141, and a cell served by the interface node 154 is referred to as a second cell in the second network 146. In this disclosure, a cell, such as the first cell, the second cell, and the like, can also refer to a respective interface node and services provided by the interface node. For example, the electronic device 110 can be served by the first cell or the interface node 150.

In an embodiment, the first network 141 for the high speed rail usage is configured to provide wireless communication service, for example, in a high speed scenario, for passengers on high speed trains running on high speed rail. In an example, the first network 141 can be a high speed rail dedicated network (HSRDN). For example, cell towers of the first interface nodes 150 in the first network 141 are built along tracks of high speed rail to provide coverage along the tracks. Further, in an example, the cell towers are suitably spaced and the radio characteristics (e.g., emitting powers, radio frequencies, antenna designs, etc.) of the cell towers are suitably configured according to relatively high speed and according to relatively large penetration loss due to high speed trains to optimize wireless communication service for the high speed scenario.

According to aspects of the disclosure, the interface node 150 can be configured to indicate, for example in first system information, a network type of the first network 141. Additionally, in an example, the interface node 150 can also indicate a mobility status requirement, such as a high speed requirement, for electronic devices that are intended to be supported by the first network 141. The interface node 150 can generate a high speed rail (HSR) signature and embed the HSR signature in, for example, the first system information for broadcasting to electronic devices and neighboring cells of the first cell. The HSR signature indicates a network for the high speed rail usage, such as a HSRDN, thus the first network 141 supports electronic devices with a high mobility such as a speed of about or over 120 miles per hour. For example, the interface node 150 can include the HSR signature in system information block (SIB). Further, the interface node 150 can be configured to generate signals, such as paging signals, reference signals, and the like to measure mobility of the electronic devices.

As described above, the second network 146 provides wireless communication service for the normal public usage. In some embodiments, an interface node 154 can be configured not to include specific signatures in second system information. In an example, a lack of the specific signatures indicates, by default, that the second network 146 is for the normal public usage. Similarly, the interface node 154 can also indicate a mobility status requirement, such as a low speed requirement, for electronic devices that are intended to be supported by the second network 146. In some embodiments, an interface node 154 can include a normal public signature in respective second system information to indicate a network for the normal public usage.

According to aspects of the disclosure, the interface node 150 can also be configured to implement mobility based handover for electronic devices. In an example, the electronic device 110 is connected to and served by the interface node 150. The interface node 150 can extract a mobility of the electronic device 110 based on signals from the electronic device 110. The interface node 150 can detect network types of neighboring cells of the first cell, for example, by detecting a network signature including the HSR signature, a lack of the specific signatures, the normal public signature, and the like in the received system information of the neighboring cells.

The interface node 150 can be configured to select one of the neighboring cells based on the mobility and initialize a switching of the electronic device 110 from the present serving cell to the selected neighboring cell. In an example, the interface node 150 can initialize a switching of the electronic device 110 to a first neighboring cell in the first network 141 when the speed is high, and initialize a switching of the electronic device 110 to a second neighboring cell in the second network 146 when the speed is low.

In some embodiments, the interface node 154 can also be configured to implement mobility based handover of electronic devices in a similar manner, thus the description of the mobility based handover by the interface node 154 is omitted for purposes of clarity. In an example, the interface node 154 can also be configured to generate signals to enable mobility measurement by electronic devices.

In some embodiments, the interface node 154 does not implement mobility based handover of electronic devices.

The mobility based handover can be collaboratively performed by electronic devices, core nodes 156 and 152 and the interface nodes 150.

In an example, the interface node 150 can also include information of the neighboring cells in the first system information, such as respective network type and motility status requirement of the neighboring cells. In an example, the interface node 154 can include similar information of neighboring cells of the second cell in the second system information.

In an embodiment, the electronic device 110 can be any suitable electronic device that can implement mobility based network access. In an example, the electronic device 110 is a terminal device (e.g., user equipment) used by an end-user for mobile communication, such as a cell phone, a smart phone, a tablet computer, a laptop, a smart device, and the like. In an embodiment, the electronic device 110 belongs to a person who uses the electronic device 110 for communication via the network 101. The person with the electronic device 110 can board on a train that runs on the tracks of the high speed rail. In an example, the electronic device 110 can be a mobile station.

Referring to FIG. 1, the electronic device 110 can include transceiver circuitry 112, processing circuitry 120, and memory 130. These components can be coupled together, for example using a bus architecture 111. The transceiver circuitry 112 is configured to receive and transmit wireless signals. In an example, the transceiver circuitry 112 includes receiving circuitry 116 and transmitting circuitry 114. The receiving circuitry 116 is configured to generate electrical signals in response to captured electromagnetic waves by an antenna (not shown), process the electrical signals to extract digital streams from the electrical signals. In an example, the transmitting circuitry 114 is configured to receive digital streams, such as management frames, data frames, and the like from, for example, the processing circuitry 120, generate radio frequency (RF) signals to carry the digital streams, and cause the antenna to emit electromagnetic waves in the air to transmit wireless signals that carry the digital streams. The transmitting circuitry 114 can transmit signals that are indicative of a mobility of the electronic device 110.

The receiving circuitry 116 is configured to receive signals from the network 101, such as the first network 141 and the second network 146. In an example, the receiving circuitry 116 receives a first signal carrying the first system information associated with the interface node 150. In another example, the receiving circuitry 116 receives a second signal carrying the second system information associated with the interface node 154. In an example, the first system information carries the HSR signature, and the second system information lacks the specific signatures. In some embodiments, the receiving circuitry 116 can receive reference signals that can be used for various purposes, such as, to determine the mobility of the electronic device 110, to measure signal strength from respective interface nodes or cells, and the like.

In general, the electronic device 110 can be configured to have various operation modes, such as an idle mode, a connected mode, and the like. In the idle mode, the electronic device 110 has no active connection with the network 101, but can monitor available communication channels to receive information, such as broadcast information, system information, paging information from the network 101. In the idle mode, the electronic device 110 can select and camp on a suitable cell in a process known as 'cell selection'. While camping on the suitable cell in the idle mode, the electronic device 110 can monitor other cells and decide to reselect and camp on another cell, for example, when radio coverage conditions change, in a process known as 'cell reselection'. However, in the idle mode, in an example, since no active connection has been established, the electronic device 110 does not transmit in the idle mode.

When an active connection is established between the electronic device 110 and the network 101, the electronic device 110 enters the connected mode. In the connected mode, the electronic device 110 can receive and transmit signals carrying various information, such as user data, voice call data, and the like from/to the network 101. While in a connected mode, the electronic device 110 can be switched, by the network 101, from being connected to a serving cell to a neighboring cell of the serving cell in a process known as 'handover', for example, when radio coverage conditions change.

According to aspects of the disclosure, the processing circuitry 120 can be configured to implement mobility based network access. The processing circuitry 120 can be configured to determine available cells to camp on and network types of the available cells based on the received signals from the network 101. In an example, the processing circuitry 120 determines that signal powers of the reference signals from the first cell and the second cell are above a power threshold, and signal powers from other cells are below the power threshold, thus, the processing circuitry 120 determines that the first cell and the second cell are available cells. Further, the processing circuitry 120 can extract the HSR signature from the first system information, thus, determine that the first cell is in a network for the high speed rail usage. The processing circuitry 120 can also determine that the second cell is in a network for the normal public usage, for example, from a lack of the specific signatures in the second system information.

According to an aspect of the disclosure, the processing circuitry 120 can further determine mobility of the electronic device 110 based on the received signals, such as signal variations of reference signals in a time duration. In an example, the processing circuitry 120 is configured to count a number of changes of identifiers in received system information to determine the mobility. In another example, the processing circuitry 120 is configured to estimate a speed of the electronic device 110 based on Doppler Effect.

According to an aspect of the disclosure, the processing circuitry 120 can select/reselect a suitable cell to camp on based on the mobility of the electronic device 110 and respective network types of the available cells to camp on.

The processing circuit 120 can also include suitable circuits to perform various baseband processing operations, such as voice signal processing, radio control operations for the electronic device 110, execution of applications, and the like. The processing circuitry 120 can be implemented using various techniques, such as integrated circuits, one or more processors executing software instructions, and the like.

The memory 130 can be any suitable device for storing data and instructions. In an example, the memory 130 stores criteria and instructions used to determine the mobility of the electronic device 110, and software instructions to be executed by a processor, such as the processing circuitry 120. In an embodiment, the memory 130 can be non-volatile memory, such as read-only memory, flash memory, magnetic computer storage devices, hard disk drives, solid state drives, floppy disks, and magnetic tape, optical discs, and the like. In an embodiment, the memory 130 can be a random access memory (RAM). In an embodiment, the memory 130 can include non-volatile memory and volatile memory. In an example, the memory 130 may store instructions and/or data to control the operations of the electronic device 110.

In an example, the electronic device 110 is in an idle mode and implements a cell selection/reselection based on the mobility of the electronic device 110. The processing circuitry 120 can determine available cells to camp on based on signals received from a plurality of cells. Further, the processing circuitry 120 can determine if the available cells include a cell in a network for the high speed rail usage, for example, by extracting the HSR signature from respective system information. In an example, the available cells include the first cell in the first network 141 and the second cell in the second network 146. As described above, the processing circuitry 120 can determine the mobility of the electronic device 110. Further, the processing circuitry 120 can select/reselect the first cell for the electronic device 110 to camp on when the speed of the electronic device 110 is determined to be high (e.g., higher than a threshold). Alternatively, the processing circuitry 120 can select/reselect the second cell for the electronic device 110 to camp on when the speed is determined to be low (e.g., lower than a threshold).

In an example, the electronic device 110 is with a passenger on a high speed train, and speed of the electronic device 110 decreases from being high, for example, when the high speed train travels at 120 miles per hour, to being low, for example, when the passenger is off the high speed train. In an embodiment, when the electronic device 110 is in a connected mode served by the first cell in the first network 141, for example, when the electronic device 110 is used in a phone call. Neighboring cells of the first cell include the second cell in the second network 146. The first cell can be configured to obtain a mobility of the electronic device 110. Further, when the first cell determines that the speed is low and handover criteria from the first cell to the second cell are satisfied, the first cell can initialize a switching of the electronic device 110 to the second cell, for example, to free network resources for other electronic devices having high speeds.

In an example, the electronic device 110 is with a passenger on a high speed train, and speed of the electronic device 110 increases from being low, for example, when the passenger is boarding the high speed train, to being high, for example, when the high speed train accelerates to a speed of 120 miles per hour. In an embodiment, when the electronic device 110 is in a connected mode served by the second cell in the second network 146, for example, when the electronic device 110 is used in a phone call. Neighboring cells of the second cell include the first cell in the first network 141. The second cell can be configured to obtain a mobility of the electronic device 110. Further, when the second cell determines that the speed is high and handover criteria from the second cell to the first cell is satisfied, the second cell can initialize a switching of the electronic device 110 to the first cell, for example, to optimize user experience for the passenger on the high speed train having a high speed.

Figure 2:
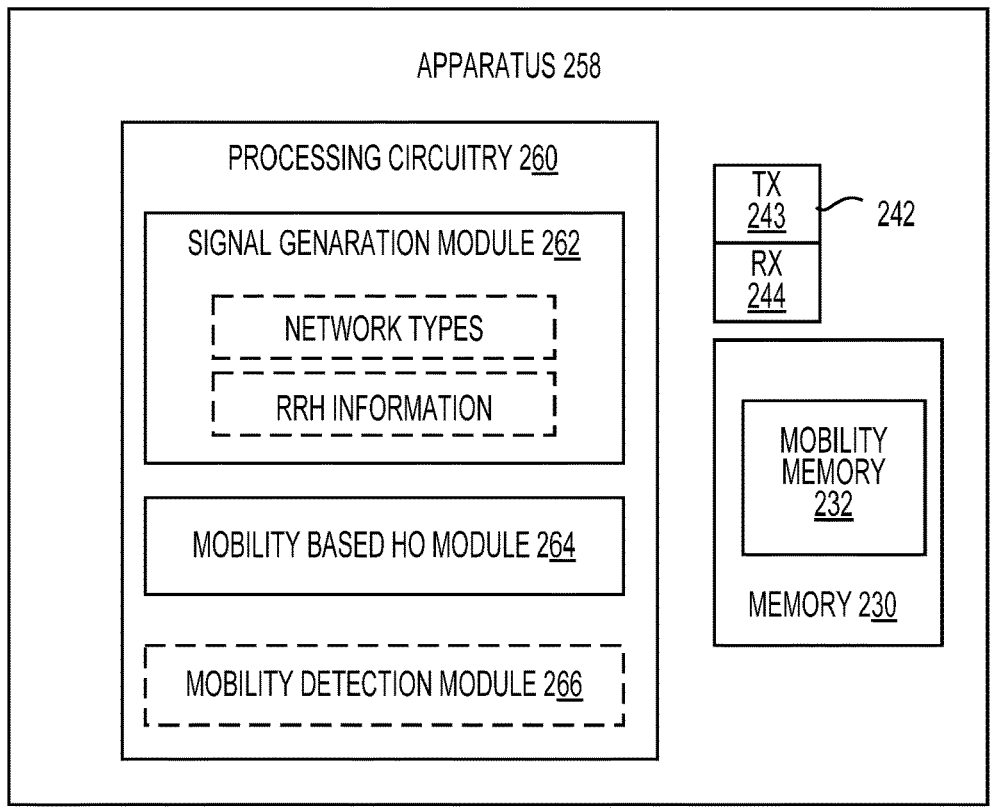
FIG. 2 shows a block diagram of an apparatus 258 according to an embodiment of the disclosure.

FIG. 2 shows a block diagram of an apparatus 258 according to an embodiment of the disclosure. In an example, the apparatus 258 can be a physical implementation of an interface node, such as an interface node 150, an interface node 154, and the like.

The apparatus 258 can include transceiver circuitry 242, processing circuitry 260, and memory 230. These components are coupled together, for example, using a bus architecture (not shown). The transceiver circuitry 242 can include transmitting circuitry 243 and receiving circuitry 244. The transmitting circuitry 243 can transmit signals. In an example, the signals can include system information of the interface node and reference signals.

The receiving circuitry 244 can receive signals. In an example, the signals include mobility of an electronic device, radio resource management (RRM) measurements of reference signals from an electronic device, and the like.

In an example, the transceiver circuitry 242 includes wireless transceiver circuits. In another example, the transceiver circuitry 242 also includes wired transceiver circuits.

According to aspects of the disclosure, the processing circuitry 260 can be configured to implement mobility based handover of electronic devices. Referring to FIG. 2, the processing circuitry 260 can include a signal generation module 262 that generates, for example, system information and can include a mobility based handover (HO) module 264 that implements mobility based handover.

In an example, the apparatus 258 is associated with a serving cell. Neighboring cells of the serving cell include a first neighboring cell lacking of the specific signatures and a second neighboring cell having the HSR signature. When the apparatus 258 detects a lack of the specific signatures of the first neighboring cell, the mobility based HO module 264 determines that the first neighboring cell is in a network for the normal public usage. When the apparatus 258 detects the HSR signature of the second neighboring cell, the mobility based HO module 264 determines that the second neighboring cell is in a network for the high speed rail usage.

In an example, the mobility based HO module 264 can determine characteristics of the serving cell and the first neighboring cell based on received reference signals over a certain time duration. The characteristics can include reference signal received power (RSRP) and reference signal received quality (RSRQ) of the serving cell, RSRP and RSRQ of the first neighboring cell, and the like. Further, the mobility based HO module 264 can determine whether HO criteria from the serving cell to the first neighboring cell ismet based on the characteristics of the serving cell and the first neighboring cell. Similarly, the mobility based HO module 264 can determine whether HO criteria from the serving cell to the second neighboring cell is met.

In an example, the mobility based HO module 264 extracts the mobility information of the electronic device 110, such as a mobility status or a speed of the electronic device 110, from the signals received by the receiving circuitry 244. In an example, the mobility based HO module 264 can compare the mobility status with a certain condition, and determine that the speed is high when the mobility status satisfies the certain condition and determine that the speed is low when the mobility status fails to satisfy the certain condition. Alternatively, the mobility based HO module 264 can compare the speed with a speed threshold, and determine that the speed is high when the speed is above the speed threshold and the speed is low when the speed is below the speed threshold.

In an embodiment, when the mobility based HO module 264 determines that the speed of the electronic device 110 is low and HO criteria from the serving cell to the first neighboring cell ismet, as described above, the mobility based HO module 264 initiates switching connection of the electronic device 110 from the serving cell to the first neighboring cell. On the other hand, when the mobility based HO module 264 determines that the speed is high and HO criteria from the serving cell to the second neighboring cell ismet, the mobility based HO module 264 initiates switching connection of the electronic device 110 from the serving cell to the second neighboring cell. In an example, handover request from the serving cell to the first or second neighboring cell can include the mobility of the electronic device 110.

As described above, when the speed of the electronic device 110 is low, the mobility based HO module 264 gives a higher priority to a neighboring cell that is in a network for the normal public usage, such as a NPN, when choosing a neighboring cell to handover the electronic device 110. When the speed is high, the mobility based HO module 264 gives a higher priority to a neighboring cell in a network for the high speed rail usage, such as a HSRDN.

In an example, the mobility based HO module 264 can also be configured to redirect an electronic device to a cell in a suitable network based on the mobility of the electronic device and a network type of the suitable network.

In an embodiment, the mobility based HO module 264 can initialize switching connection of an electronic device based on a suitable combination of a mobility of the electronic device and characteristics of a neighboring cell. The characteristics can include RSRP, RSRQ, a carrier frequency, a radio access technology, and the like of the neighboring cell. For example, when choosing a neighboring cell to handover the electronic device 110, the mobility based HO module 264 can give a higher priority to a neighboring cell using a certain carrier frequency or a certain radio access technology. Alternatively, various weights can be assigned to the mobility and respective characteristics, thus, a weighted combination of the characteristics can be used to determine a neighboring cell to handover the electronic device 110.

In some embodiments, multiple RRHs, or remote radio unit (RRUs), can be used to extend radio coverage of the interface node. In an example, the multiple RRHs respectively include RF circuitry, analog-to-digital/digital-to-analog converters, and the like. In an example, at least one of the RRHs is similarly configured as the apparatus 258. In another example, at least one of the RRHs is configured to include the processing circuitry 260.

A sub-cell refers to a physical area served by a RRH that provides the sub-cell with suitable radio coverage. The RRH or the sub-cell has a RRH index (or identifier) that identifies the RRH. In an example, each RRH of the multiple RRHs has a different RRH index. A cell associated with the interface node includes the sub-cells associated with the multiple RRHs. According to aspects of the disclosure, the signal generation module 262 can generate RRH information including, for example, RRH indices. In an example, the RRH information can be included in reference signals, physical broadcast channel (PBCH), and system information, and the like of the interface node. According to an aspect of the disclosure, the RRH information can be used to measure mobility of the electronic device 110. In an example, the signal generation module 262 can also indicate a number of RRHs used to measure the mobility.

In an example, multiple RRHs are in the first cell of the first network 141 in FIG. 1. The first cell can share RRH information of the multiple RRHs with other cells including cells in networks for the high speed usage and cells in networks for the normal public usage.

According to aspects of the disclosure, the signal generation module 262 can be configured to indicate a network type of the interface node in, for example, the system information. In an example, the signal generation module 262 can generate and embed the HSR signature in the system information to indicate a network for the high speed rail usage. The signal generation module 262 can generate and embed the normal public signature in the system information to indicate a network for the normal public usage. Alternatively, a lack of a signature of a network type in the system information indicates a network for the normal public usage.

In an example, the HSR signature or the normal public signature is indicated by a binary bit in the system information, such as a value "1" representing the HSR signature and a value "0" representing the normal public signature. Alternatively, omission of the binary bit indicates a network for the normal public usage.

In an example, the signal generation module 262 can also include information such as network types of other interface nodes in the system information.

According to aspects of the disclosure, the processing circuitry 260 can further include a mobility detection module 266 configured to determine mobility of electronic devices. For example, the mobility detection module 266 can measure the mobility based on uplink signals, such as a demodulation reference signal (DMRS), a sound reference signal, received from the electronic devices.

The memory 230 can be any suitable device for storing data and instructions. In an example, the memory 230 stores criteria and instructions used to determine whether mobility of the electronic device 110 is high, such as in mobility memory 232, and software instructions to be executed by a processor, such as the processing circuitry 260. The memory 230 can include similar types of memory as those of the memory 130, thus, the description is omitted for purposes of clarity.

Figure 3:
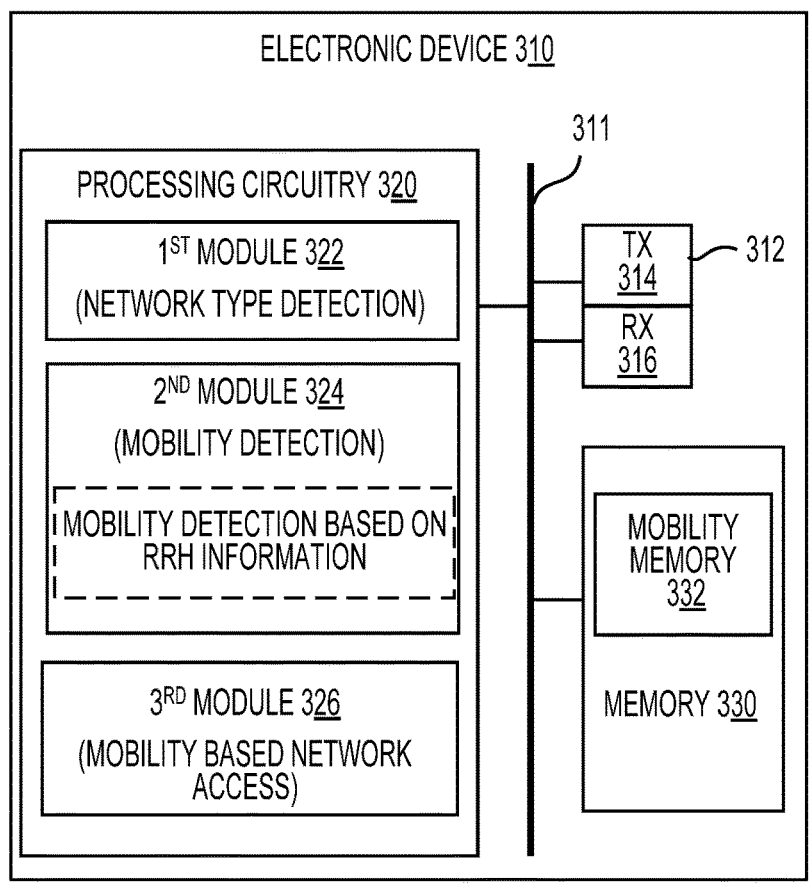
FIG. 3 shows a block diagram of an electronic device 310 according to an embodiment of the disclosure.

FIG. 3 shows a block diagram of an electronic device 310 according to an embodiment of the disclosure. The electronic device 310 can be any suitable electronic device that can implement mobility based network access. In an example, the electronic device 110 in the communication system 100 can be implemented using the electronic device 310.

Referring to FIG. 3, the electronic device 310 includes transceiver circuitry 312, processing circuitry 320, and memory 330. These components can be coupled together, for example using a bus architecture 311. The transceiver circuitry 312 further includes a transmitting circuitry 314 and a receiving circuitry 316. The transceiver circuitry 312 can have identical or similar functions and components as those of the transceiver circuitry 112 shown in FIG. 1, thus, the description is omitted for purposes of clarity.

The processing circuitry 320 includes a first module 322 for network type detection, a second module 324 for mobility detection, and a third module 326 for mobility based network access. The first module 322 can receive signals from the receiving circuit 316. The signals can be for example, system information, reference signals, PBCH, and the like that are associated with a plurality of cells.

According to an aspect of the disclosure, the first module 322 can be configured to determine one or more network types based on, for example, the signals. In an embodiment, the first module 322 extracts a network type signature, such as the HSR signature, the normal public signature, and the like from system information in the signals, and determines the one or more network types accordingly. In addition, the first module 322 can determine that the system information of a certain network lacks the specific signatures, thus, the certain network is for the normal public usage.

According to an aspect of the disclosure, the second module 324 can be configured to determine mobility of the electronic device 310 based on, for example, the signals.

According to an aspect of the disclosure, the signals can include RRH information, and the second module 324 can determine the mobility based on the RRH information. In an example, the RRH information can include RRH indices associated with RRHs of a cell, such as the first cell in the first network 141 in FIG. 1.

In an example, the second module 324 can determine a RRH change rate and determine the mobility based on the RRH change rate.

In an example, the RRH change rate is related to a number of RRHs that the electronic device 310 has passed in a time duration when the time duration remains constant. Therefore, when the number of RRHs is larger than or equal to a first RRH threshold, the second module 324 determines that the electronic device 310 has a first mobility level. When the number of RRHs is less than the first RRH threshold and is larger than or equal to a second RRH threshold, the second module 324 determines that the electronic device 310 has a second mobility level. When the number of RRHs is less than the second RRH threshold, the second module 324 determines that the electronic device 310 has a third mobility level. In an example, the first RRH threshold and the second RRH threshold are positive integers, and the first RRH threshold is larger than the second RRH threshold. The first RRH threshold and the second RRH threshold can be included in the system information of the interface node or can be determined by the electronic device 310. Note that other suitable number of RRH thresholds can be used to obtain a respective number of mobility levels.

According to an aspect of the disclosure, the second module 324 can determine the RRH change rate based on the RRH indices. In an example, a change rate of the RRH indices can be used to determine the mobility. For example, the second module 324 can continuously monitor the RRH indices of the respective RRHs that the electronic device 310 has passed in a time duration. In addition, the second module 324 can count a number of the RRHs and determine the mobility accordingly.

In some embodiments, each serving cell includes multiple RRHs that are associated with the serving cell. The second module 324 can obtain the association between the RRHs and the serving cell, and identify the RRHs based on the association. In an example, the association can be configured by a radio resource control (RRC) layer. The second module 324 can obtain the association via signaling. In an example, the second module 324 can obtain a cell ID of the serving cell from, for example, respective system information. The second module 324 can obtain the association based on, for example, default relationship between the RRH indices and the cell ID.

In an example, the RRH indices can be included, for example, as special sequences in the reference signals. The second module 324 can extract the RRH indices by decoding the special sequences. In an example, the RRH indices can be extracted using digital signal processors (DSPs).

In an example, the mobility is determined based on the RRH information of RRHs of a same cell. The RRHs can have a same cell ID and different RRH indices. In an example, the RRH information used to determine the mobility is based on RRHs of a cell in a network for the high speed rail usage, such as a HSRDN, with a same cell ID and different RRH indices.

According to an aspect of the disclosure, the second module 324 can also obtain the mobility based on signal variations of the references signals. In an example, the second module 324 can obtain the mobility based on signal variation of a references signal within a time duration, such signal power, signal correlation, a frequency difference, and the like. In an example, the frequency difference is related to a Doppler shift of a reference signal. The reference signals can include a cell-specific reference signal (CRS), a demodulation reference signal (DMRS), a user equipment reference signal (UERS), a detection reference signal (DRS), and the like.

When the signal variation is larger than or equal to a first variation threshold, the second module 324 determines that the electronic device 310 has a first mobility level. When the signal variation is less than the first variation threshold and is larger than or equal to a second variation threshold, the second module 324 determines that the electronic device 310 has a second mobility level. When the signal variation is less than the second variation threshold, the second module 324 determines that the electronic device 310 has a third mobility level. In an example, the first variation threshold and the second variation threshold are real numbers, and the first variation threshold is larger than the second variation threshold. The first variation threshold and the second variation threshold can be included in the signals or can be determined by the electronic device 310. Similarly, other suitable number of variation thresholds can be used to obtain a respective number of mobility levels.

According to an aspect of the disclosure, the second module 324 can also obtain the mobility based on a cell change rate. In an example, the second module 324 can calculate a number of cells that the electronic device 310 passes in a time duration, and determine the mobility.

The number of cells, the number of RRHs, the time duration, and the like that are related to determining the mobility can be sent to the electronic device 310 in the signals or determined by the electronic device 310.

In an example, the second module 324 can use satellite positioning information to determine the mobility. In an example, the electronic device 310 includes a global positioning system (GPS) (not shown) configured to receive satellite positioning signals transmitted by a satellite system. The second module 324 can calculate position or speed of the electronic device 310 based on the satellite positioning signals, and subsequently determine the mobility.

In an example, the electronic device 310 can include a motion sensor (not shown) configured to obtain motion of the electronic device 310, such as acceleration and velocity. In an example, the motion sensor can include an inertia measurement unit, a platform having multiple gyroscopes and accelerometers fixed to the electronic device 310 and providing information on motions of the platform. The information is then used to obtain the mobility.

According to an aspect of the disclosure, the second module 324 can further determine the speed being high or low based on a mapping relationship. For example, the first mobility level and the second mobility level correspond to the speed being high, the third mobility level corresponds to the speed being low. In an example, the first mobility level corresponds to the speed being high, the second mobility level and the third mobility level correspond to the speed being low. As described above, other number of mobility levels can also be used, thus the mapping relationship can be adjusted accordingly.

The third module 326 can be configured to implement mobility based network access. According to an aspect of the disclosure, the third module 326 can determine a suitable cell for the electronic device 310 to camp on based on the mobility and network types of available cells, as described above. In an embodiment, the third module 326 can obtain the mobility from the second module 324, and the network types of the available cells from the first module 322.

In an example, the third module 326 can select/reselect a cell in a network for the high speed rail usage, such as a HSRDN, for the electronic device 310 to camp on when the third module 326 determines that the mobility satisfies a preset mobility condition or the speed is high. On the other hand, the third module 326 can select/reselect a cell in a network for the normal public usage, such as a NPN, for the electronic device 310 to camp on when the third module 326 determines that the mobility fails to satisfy the preset mobility condition or the speed is low. In addition, when the third module 326 determines that the speed is high and the available cells do not include a cell in a network for the high speed rail usage, the third module 326 can select/reselect, for example by a default setting, a cell in a network for the normal public usage for the electronic device 310 to camp on.

As described above, when determining a cell for the electronic device 310 to camp on, the third module 326 gives a higher priority to a cell in a network for the normal public usage when the speed is low. Otherwise, the third module 326 gives a higher priority to a cell in a network for the high speed rail usage.

According to aspects of the disclosure, the third module 326 can choose a cell to camp on based on a suitable combination of a mobility of the electronic device 310 and characteristics of a cell to camp on. As described above, the characteristics can include RSRP, RSRQ, a carrier frequency, a radio access technology, and the like of the cell. For example, when choosing a cell to camp on, the third module 326 can give a higher priority to a cell having a certain carrier frequency or a certain radio access technology. Alternatively, various weights can be assigned to the mobility and the characteristics, thus, a weighted combination of the characteristics can be used to determine a cell to camp on.

The memory 330 can have identical or similar functions and components as those of the memory 130, thus, the description of the memory 330 is omitted for purposes of clarity. Note that the memory 330 can store criteria and instructions used to determine the mobility, such as the first RRH threshold, the second RRH threshold, the third RRH threshold, the first variation threshold, the second variation threshold, the third variation threshold, the mapping relationship, and the like in the mobility memory 332.

Figure 4:
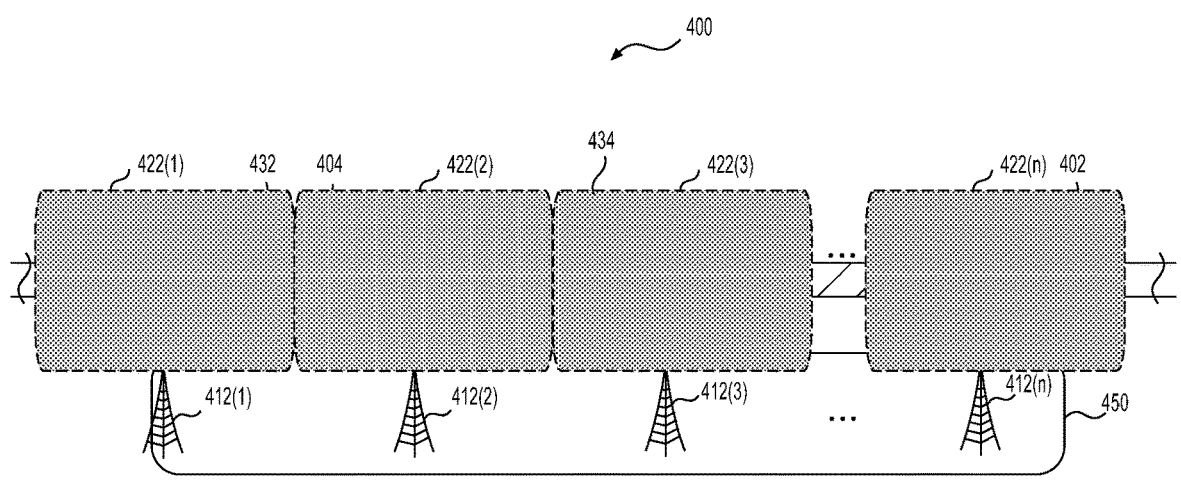
FIG. 4 shows a plot 400 illustrating mobility measurement according to an embodiment of the disclosure.

FIG. 4 shows a plot illustrating mobility measurement according to an embodiment of the disclosure. The measurement scenario 400 shows a first electronic device 432, a second electronic device 434, and a plurality of RRHs 412(1-n). In an example, the plurality of RRHs 412(1-n) belong to an interface node 450 in a network for the high speed rail usage, such as a HSRDN, and are constructed along tracks 402 of high speed rail to provide wireless communication service coverage for high speed rail. The plurality of RRHs 412(1-n) are associated with respective sub-cells 422(1-n) having RRH indices.

The interface node 450 has equivalent or identical functions and components as those of the interface nodes 150 or the interface nodes 154. The first electronic device 432 and the second electronic device 434 have equivalent or identical functions and components as those of the electronic device 310. Therefore, descriptions of the interface node 450, the first electronic device 432, and the second electronic device 434 are omitted for purposes of clarity.

In the FIG. 4 example, the first electronic device 432 is with a first user who is on the train 404. The train 404 is running at a speed of about or over 120 miles per hour on the tracks 402 of high speed rail. The second electronic device 434 is with a second user who is walking near the tracks 402 at a speed of for example 2 miles per hour.

The first electronic device 432 and the second electronic device 434 receive the RRH information including the RRH indices. According to an aspect of the disclosure, mobility of the first electronic device 432, or the first mobility, can be determined based on the RRH information. In an example, the RRH information can be obtained from reference signals, PBCH, and system information, and the like.

As described above, a RRH change rate of the first electronic device 432 can be used to determine the first mobility. In an example, the RRH change rate is related with a number of RRHs that the first electronic device 432 has passed in a time duration. Therefore, the first electronic device 432 can determine the first mobility based on the number of RRHs, for example, when the time duration remains constant.

According to an aspect of the disclosure, the first electronic device 432 can determine the RRH change rate based on RRH indices. A change rate of RRH indices can be used to determine the RRH change rate.

Similarly, mobility of the second electronic device 434, or the second mobility can be determined based on a RRH change rate, a change rate of the RRH indices, and the like.

In an example, two thresholds, such as a first RRH threshold of 3 and a second RRH threshold of 1 are used to define three mobility levels. For example, when the number of RRHs that are passed by an electronic device during a time duration is larger than the first RRH threshold, the electronic device has a first mobility level. When the number of RRHs that are passed by an electronic device during the time duration is between the first RRH threshold and the second RRH threshold, the electronic device has a second mobility level. When the number of RRHs that are passed by an electronic device during the time duration is lower than the second RRH threshold, the electronic device has a third mobility level. In the example, the first electronic device 432 passes four RRHs while the second electronic device 434 passes zero RRHs in the same time duration. Therefore, the first electronic device 432 has the first mobility level, and the second electronic device 434 has the third mobility level. Based on the mapping relationship described above, the first electronic device 432 has a high speed and the second electronic device 434 has a low speed.

In an embodiment, a RRH change rate or a change rate of RRH indices can be determined over a first time duration for the first electronic device 432, and over a second time duration of a different time length from the first time duration for the second electronic device 434. Accordingly, different RRH thresholds can be used corresponding to respective time durations.

Figure 5:
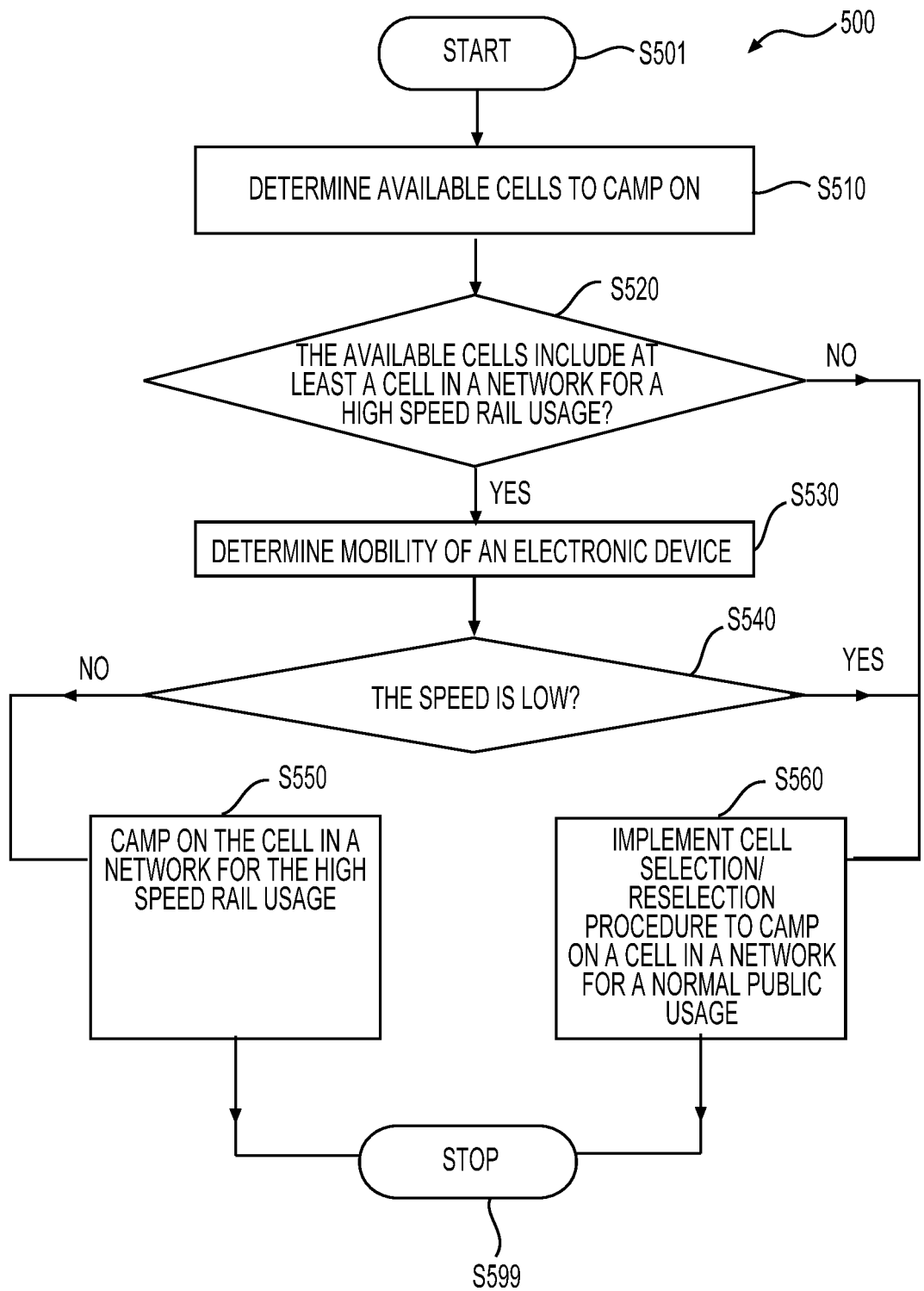
FIG. 5 shows a flow chart outlining a process 500 according to an embodiment of the disclosure.

FIG. 5 shows a flow chart outlining a process 500 according to an embodiment of the disclosure. In an example, the process 500 is executed by an electronic device, such as the electronic device 110 in FIG. 1, the electronic device 310 in FIG. 3, and the like. The process 500 starts at S501, and proceeds to S510.

At S510, available cells for an electronic device to camp on are determined. In an embodiment, the electronic device is in an idle mode. The electronic device, such as the electronic device 110, can receive signals including system information and reference signals from a plurality of cells, such as the first cell in the first network 141 and the second cell in the second network 146 of FIG. 1. The available cells to camp on can be determined based on the signals.

In an example, the reference signals can be characterized, and a first list of cells to camp on can be determined based on characteristics of the reference signals including RSRP, RSRQ, a carrier frequency, a radio access technology, and the like.

In an example, the signals can also include a second list of cells eligible for, for example, a cell reselection. The reference signals of cells in the second list can be characterized, and the first list of cells can be determined based on the characteristics of the reference signals described above.

The available cells to camp on can include cells in the first list of cells. Further, the available cells can further be ranked or assigned with a priority for cell selection/reselection according to certain criteria, for example, based on one or a combination of the characteristics of the reference signals, as described above. The process 500 then proceeds to S520.

At S520, whether the available cells include at least a cell in a network for the high speed rail usage, such as a HSRDN, is determined. In an embodiment, the signals can include network types of the plurality of cells, for example, in the respective system information. As described above, network types associated with the available cells can be determined based on the signals. In an example, the network types of the plurality of cells can be obtained from system information of one of the plurality of cells that has a largest RSRP.

In an example, when the HSR signature of a network is detected from the respective system information, the network is a network for the high speed rail usage.

When the available cells detect at least a cell in a network for the high speed rail usage, the process 500 proceeds to S530; otherwise, the process 500 proceeds to S560.

At S530, mobility of an electronic device is determined. In an example, the mobility can be determined using the second module 324 of the electronic device 310. In an example, the mobility can be determined based on RRH information in the signals, such as a RRH change rate, a change rate of RRH indices, and the like. Alternatively, the mobility can be determined based on signal variations of a reference signal, satellite position signals, measurements of a motion sensor, and the like.

At S540, the speed can be determined to be low or high based on, for example, a preset mobility condition, as described above. When the speed is low, the process 500 proceeds to S560; otherwise, the speed is high, and the process 500 proceeds to S550.

At S550, the speed is high, and the electronic device can camp on the cell in the network for the high speed rail usage that is determined at S520. In an embodiment, the available cells include multiple cells in one or more networks, and each of the one or more networks is a network for the high speed rail usage. In an example, the multiple cells can be further ranked according to one or a combination of the characteristics of the multiple cells. As described above, the characteristics can include RSRP, RSRQ, a carrier frequency, a radio access technology, and the like. In an example, an optimal cell with optimal characteristics can be chosen from the multiple cells, and the electronic device can camp on the optimal cell.

At S560, the speed is low or the available cells do not include a cell in a network for the high speed rail usage, thus, cell selection/reselection procedures to camp on a cell in a network for the normal public usage can be implemented. For example, when the available cells include a cell in a network for the normal public usage, the electronic device camps on the cell in the network for the normal public usage. In an example, the available cells include multiple cells in one or more networks, and each of the one or more networks is a network for the normal public usage. Similarly, an optimal cell in a network for the normal public usage can be chosen, and the electronic device can camp on the optimal cell. The process 500 then proceeds to S599, and terminates.

Figure 6A:
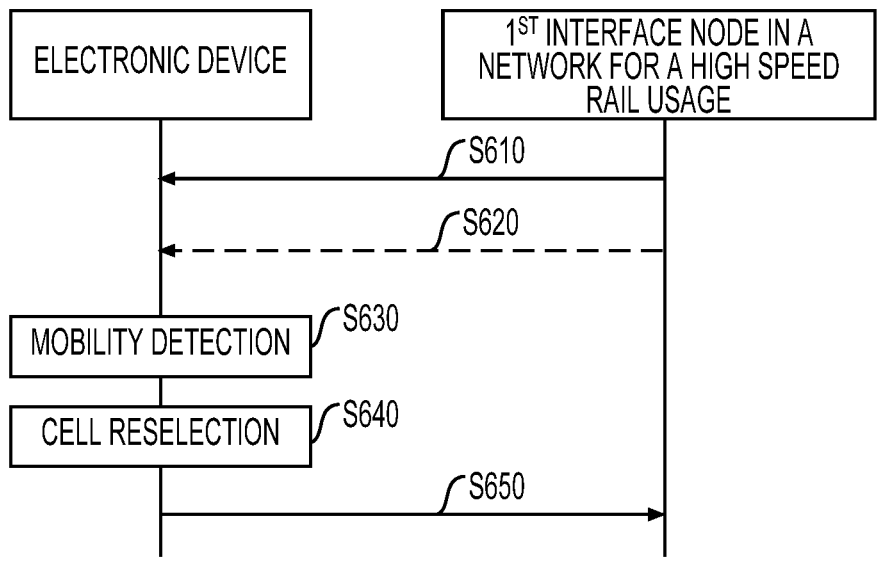
FIG. 6A shows a plot illustrating cell reselection according to an embodiment of the disclosure.

FIG. 6A shows a plot illustrating cell reselection according to an embodiment of the disclosure. An electronic device camps on a current cell, and also monitors other cells including a first cell associated with a first interface node in a network for the high speed rail usage. Referring to FIG. 6A, the first cell is in a network for the high speed rail usage. At S610, the electronic device receives signals from the first interface node or the first cell. The signals include system information including a network type of the first cell. The system information can also include information, such as network types, cell IDs, carrier frequencies, and the like of neighboring cells of the first cell. In the FIG. 6A example, the network type of the first cell is a network for the high speed rail usage, and the first cell is determined to be available for the electronic device to camp on.

At S620, the first interface node can send signals that can be used to measure the mobility of the electronic device.

At S630, the mobility of the electronic device can be detected. In an example of FIG. 6A, the speed of the electronic device is determined to be high.

As described above, the speed is high, and the first cell in the network for the high speed rail usage, is available for the electronic device to camp on. At S640, a cell reselection based on mobility is implemented, and the electronic device reselects the first cell to camp on. At S650, the electronic device implements an initial access to the first cell.

Figure 6B:
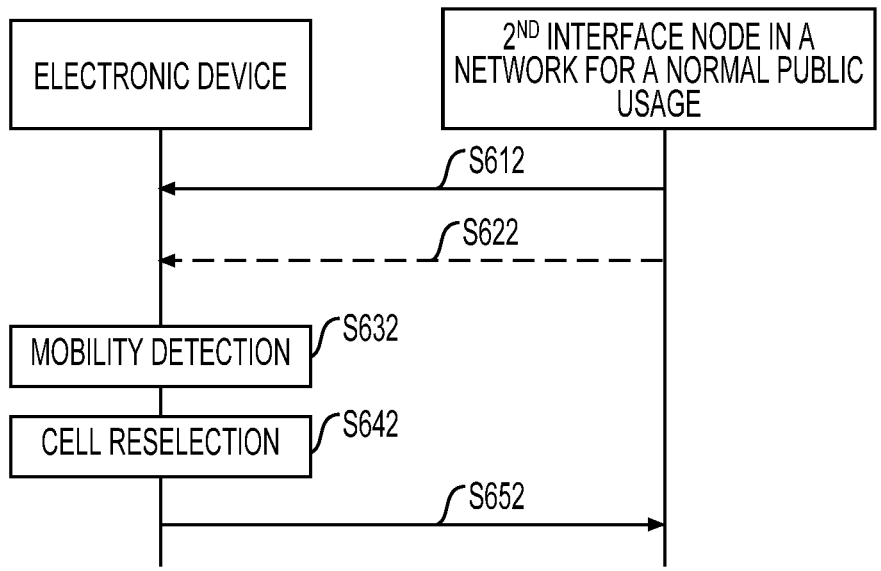
FIG. 6B shows a plot illustrating cell reselection according to an embodiment of the disclosure.

FIG. 6B shows a plot illustrating cell reselection according to an embodiment of the disclosure. An electronic device camps on a current cell, and also monitors other cells including a second cell associated with a second interface node in a network for the normal public usage. Referring to FIG. 6B, the second cell is in a network for the normal public usage. At S612, the electronic device receives signals from the second interface node or the second cell. The signals include system information of the second cell, information of neighboring cells of the second cell, and the like. Note that a network type of the second cell is omitted from the received signals, thus, indicating to the electronic device that the second cell is in a network for normal public usage.

At S622, the second interface node can send signals used to measure the mobility of the electronic device.

At S632, the mobility of the electronic device can be detected. In an example of FIG. 6B, the speed of electronic device is determined to be low.

As described above, the speed is low, and the second cell in a network for the normal public usage, is available for the electronic device to camp on. At S642, a cell reselection based on mobility is implemented where the electronic device reselects the second cell to camp on. At S652, the electronic device implements an initial access to the second cell.

Note that the current cell in FIG. 6A or 6B can be a cell in a network for the normal public usage or the high speed rail usage. FIGS. 6A and 6B can also be suitably adapted to implement a cell selection. For example, the step S640 can be a cell selection based on the mobility of the electronic device. Further, the electronic device is not camping on a current cell prior to step 610.

Figure 7:
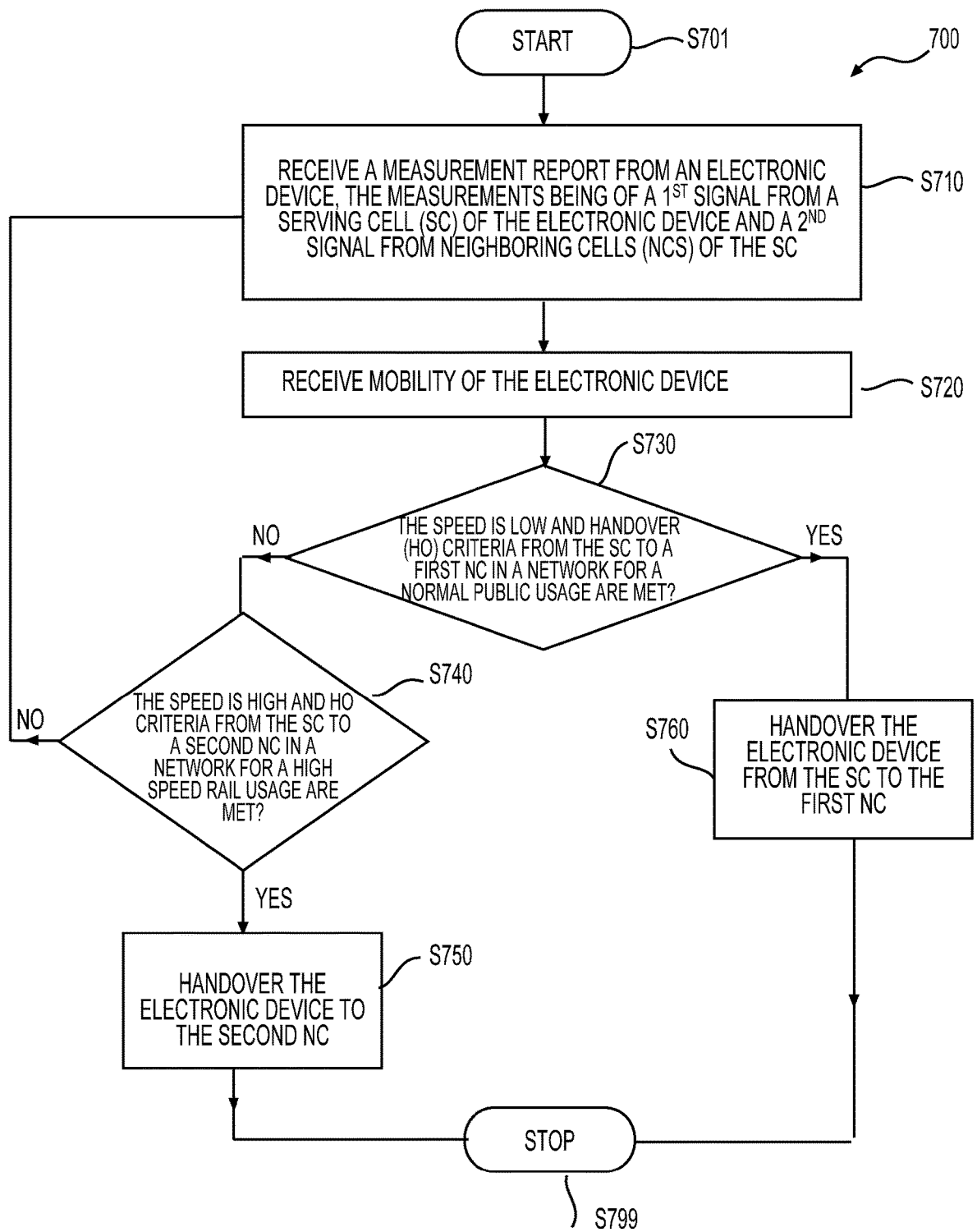
FIG. 7 shows a flow chart outlining a process 700 according to an embodiment of the disclosure.

FIG. 7 shows a flow chart outlining a process 700 according to an embodiment of the disclosure. In an example, the process 700 is executed by an interface node, such as the interface node 150 and the interface node 154 in FIG. 1. The process 700 starts at S701.

In an example, an electronic device is connected to a serving cell, such as the first cell in FIG. 1. The electronic device receives first signals from the serving cell and second signals from neighboring cells of the serving cell. The first signals can include first reference signals, first system information, and the like. The second signals can include second reference signals, second system information, and the like. The electronic device can be configured to measure characteristics of the first signals and the second signals. The characteristics can include first RSRP of the first signals, first RSRQ of the first signals, second RSRP of the second signals, second RSRQ of the second signals, and the like.

At S710, a measurement report from the electronic device can be received by the interface node. In an example, the measurement report can include the characteristics of the first signals of the serving cell and the characteristics of the second signals of the neighboring cells described above.

At S720, a mobility of the electronic device is received from the electronic device.

At S730, the interface node can determine whether first conditions are met, as described above. The first conditions include: the speed is low and handover criteria from the serving cell to a first neighboring cell in a network for the normal public usage ismet. As described above, whether the speed is low can be determined based on the mobility and a preset mobility condition. Network types of the neighboring cells can be determined based on the first signals and/or the second signals, such as the first system information and/or the second system information. In an example, the network types of the neighboring cells can be determined based on the first system information.

When the interface node determines that the first conditions are met, the process 700 proceeds to S760; otherwise, the process 700 proceeds to S740.

At S740, the interface node can determine whether second conditions are met. The second conditions include: the speed is high and handover criteria from the serving cell to a second neighboring cell in a network for the high speed rail usage ismet, as described above.

When the interface node determines that the second conditions are met, the process 700 proceeds to S750; otherwise, the process 700 returns to S710.

At S750, the speed is high and the handover criteria from the serving cell to the second neighboring cell ismet, the serving cell can initialize a switching of the electronic device to the second neighboring cell. In an example, the serving cell can send a HO request including the mobility to the second neighboring cell. Subsequently, the electronic device can be switched from the serving cell to the second neighboring cell using handover procedures for, for example, 4G mobile network technology, 5G mobile network technology, and the like. The process 700 then proceeds to S799, and terminates.

At S760, the speed is low and the handover criteria from the serving cell to the first neighboring cell ismet, the serving cell can initialize a switching of the electronic device to the first neighboring cell. In an example, the serving cell can send a HO request including the mobility to the first neighboring cell. Subsequently, the electronic device can be switched from the serving cell to the first neighboring cell using handover procedures for, for example, 4G mobile network technology, 5G mobile network technology, and the like. The process 700 then proceeds to S799, and terminates.

The process 700 in FIG. 7 can be suitably implemented to handover an electronic device from a serving cell to a suitable neighboring cell based on the mobility, such as the speed of the electronic device. The serving cell can be a cell in a network for the normal public usage or the high speed rail usage.

Figure 8A:
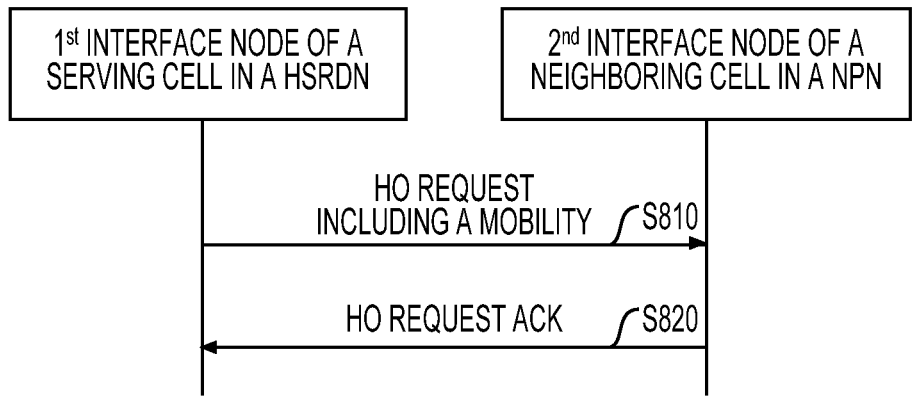
FIG. 8A shows a plot illustrating a signal exchange between two interface nodes according to an embodiment of the disclosure.

FIG. 8A shows a plot illustrating a signal exchange between two interface nodes according to an embodiment of the disclosure. An electronic device is in a connected mode served by the serving cell in a HSRDN. In an example, the electronic device is with a passenger on a high speed train, and the speed of the electronic device decreases from being high, for example, when the high speed train travels at 120 miles per hour, to being low, for example, when the passenger is off the high speed train. As described above, a first interface node of the serving cell in a HSRDN determines that the speed is low and handover criteria from the serving cell to the neighboring cell in a NPN are satisfied.

At S810, the first interface node sends a HO request to a second interface node of the neighboring cell in a NPN. The HO request can further include mobility of the electronic device, such as the speed. Subsequently at S820, the second interface node can acknowledge the HO request by sending a HO request acknowledgement (ACK) to the first interface node. The HO request ACK can include information of the second interface node.

Figure 8B:
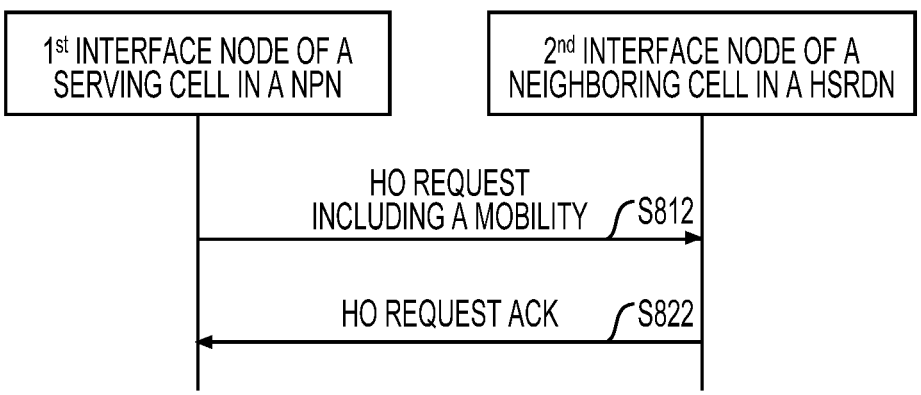
FIG. 8B shows a plot illustrating a signal exchange between two interface nodes according to an embodiment of the disclosure.

FIG. 8B shows a plot illustrating a signal exchange between two interface nodes according to an embodiment of the disclosure. An electronic device is in a connected mode served by the serving cell in a NPN. In an example, the electronic device is with a passenger on a high speed train, and the speed increases from being low, for example, when the passenger is boarding the high speed train, to being high, for example, when the high speed train accelerates to a speed of 120 miles per hour. As described above, a first interface node of the serving cell in a NPN determines that the speed is high and handover criteria from the serving cell in a NPN to the neighboring cell in a HSRDN are satisfied.

At S812, the first interface node sends a HO request to a second interface node of the neighboring cell in a HSRDN. The HO request can further include mobility of the electronic device, such as the speed. Subsequently at S822, the second interface node can acknowledge the HO request by sending a HO request ACK to the first interface node. The HO request ACK can include information of the second interface node.

Figure 9:
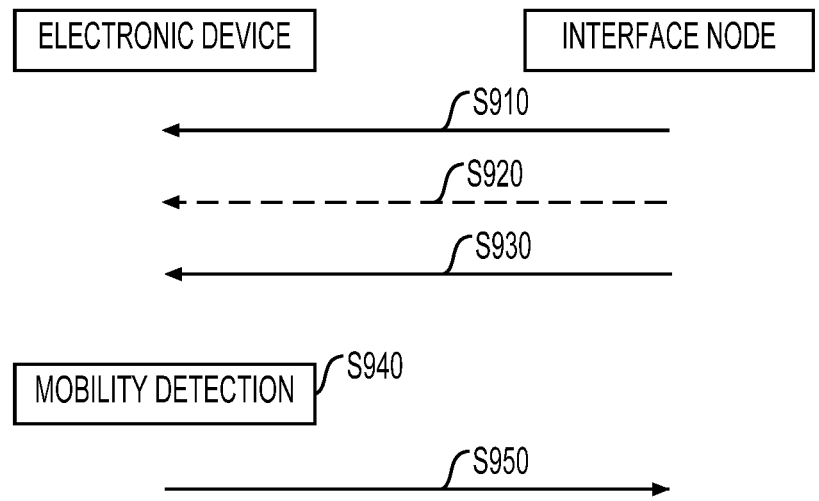
FIG. 9 shows a process performed by an electronic device and an interface node according to an embodiment of the disclosure.

FIG. 9 shows a process performed by an electronic device and an interface node according to an embodiment of the disclosure. In an example, the electronic device is in a connected mode served by a serving cell associated with the interface node. The serving cell can be a cell in a HSRDN or a NPN.

At S910, the electronic device receives signals from the serving cell. The signals include system information having a network type of the serving cell, information of neighboring cells of the serving cell, and the like. In an example, the information, such as network types, of the neighboring cells can also be included in the system information of the serving cell. In an example, when the serving cell is in a HSRDN, the system information can include the HSR signature to indicate a network for the high speed rail usage.

At S920, the serving cell can send to the electronic device signals, such as RRH information, used to measure the mobility.

At S930, RRM measurement configurations can be sent from the serving cell to the electronic device. Further, the serving cell can request the electronic device to send a measurement report including the mobility of the electronic device.

In an example, the electronic device implements steps S940 and S950 when certain conditions are met.

At S940, the mobility of the electronic device can be detected by the electronic device, as described above. At S950, the RRM measurement report is sent from the electronic device to the serving cell. The RRM measurement report can include the mobility of the electronic device.

Figure 10:
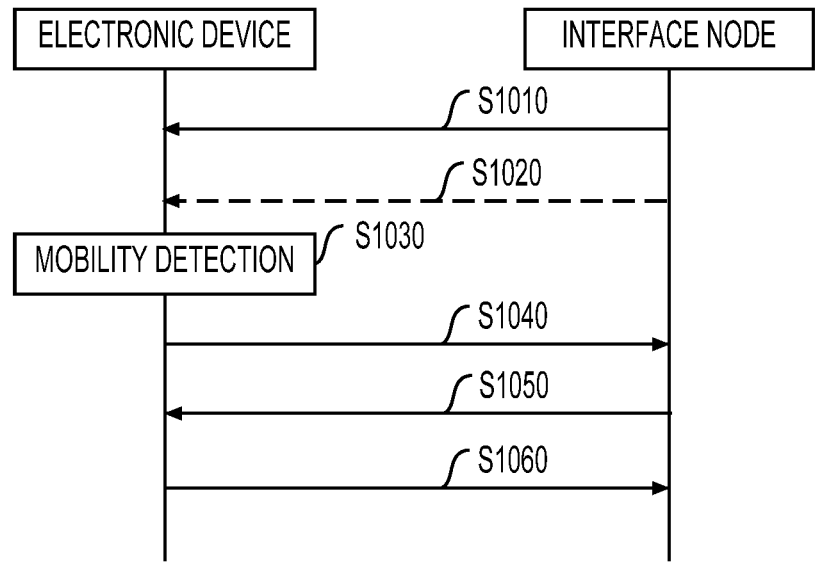
FIG. 10 shows a process performed by an electronic device and an interface node according to an embodiment of the disclosure.

FIG. 10 shows a process performed by an electronic device and an interface node according to an embodiment of the disclosure. In an example, the electronic device is in a connected mode served by a serving cell associated with the interface node. The serving cell can be a cell in a HSRDN or in a NPN.

At S1010, the electronic device receives signals from the serving cell. The signals include system information having a network type of the serving cell, information of neighboring cells of the serving cell, and the like. In an example, the information, such as network types, of the neighboring cells can also be included in the system information of the serving cell. In an example, when the serving cell is in a HSRDN, the system information can include the HSR signature to indicate a network for the high speed rail usage. In an example, the serving cell can indicate a network type of a neighboring cell in the system information.

At S1020, the serving cell can send to the electronic device signals used to measure the mobility.

At S1030, the mobility can be determined, as described above.

At S1040, the electronic device sends the mobility to the serving cell.

At S1050, a RRM measurement configuration based on the mobility can be sent from the serving cell to the electronic device.

At S1060, the electronic device can implement a RRM measurement and send a RRM measurement report to the serving cell. In an example, when certain conditions are met, the RRM measurement report including the mobility of the electronic device can be sent to the serving cell.

The various circuitry, circuits, components, modules, and the like in the present disclosure can be implemented using any suitable technology, such as an integrated circuit (IC), ICs, digital signal processors (DSPs), microprocessors, CPUs, field programmable gate arrays, (FPGAs), Application-specific integrated circuits (ASICs), and the like. In an example, the various circuitry, components, modules, and the like can also include one or more processing circuits executing software instructions.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

The invention claimed is:

1. An electronic device, comprising:
    transceiver circuitry configured to receive signals from wireless service provider networks; and
    processing circuitry configured to:
        detect, from the signals, a high speed rail (HSR) signature of one of the wireless service provider networks, the HSR signature indicating that the one of the wireless service provider networks is a first network for a high speed rail usage;

extract, based on the signals, remote radio head (RRH) information associated with RRHs;
determine a mobility of the electronic device based on the RRH information in a time duration; and
selectively camp on a first cell of the first network based on the mobility of the electronic device.

2. The electronic device of claim 1, wherein the processing circuitry is further configured to:
extract RRH indices of the respective RRHs based on the RRH information, and
determine the mobility of the electronic device based on a change rate of the RRH indices in the time duration.

3. The electronic device of claim 1, wherein the processing circuitry is further configured to:
detect, from the signals, that another one of the wireless service provider networks is for a normal public usage;
camp on the first cell of the first network when the mobility of the electronic device satisfies a preset mobility condition; and
camp on a second cell of a second network when the mobility of the electronic device fails to satisfy the preset mobility condition, the second network being the other one of the wireless service provider networks.

4. The electronic device of claim 3, wherein the processing circuitry is further configured to:
determine characteristics of the first cell based on the signals, the characteristics including one or a combination of: reference signal received power, reference signal received quality, a carrier frequency, and a radio access technology; and
enable the electronic device to camp on the first cell when the mobility of the electronic device and the characteristics satisfy a preset selection condition.

5. The electronic device of claim 1, wherein the processing circuitry is configured to send, via the transceiver circuitry, the mobility of the electronic device to the wireless service provider networks.

6. A method, comprising:
receiving, by transceiver circuitry of an electronic device, signals from wireless service provider networks;
detecting, by processing circuitry of the electronic device, a high speed rail (HSR) signature of one of the wireless service provider networks from the signals, the HSR signature indicating that the one of the wireless service provider networks is a first network for a high speed rail usage;
extracting, based on the signals, remote radio head (RRH) information associated with RRHs;
determining a mobility of the electronic device based on the RRH information in a time duration; and
selectively camping on a first cell of the first network based on the mobility of the electronic device.

7. The method of claim 6, further comprising:
extracting RRH indices of the respective RRHs based on the RRH information; and
determining the mobility of the electronic device based on a change rate of the RIM indices in the time duration.

8. The method of claim 6, further comprising:
detecting, from the signals, that another one of the wireless service provider networks is for a normal public usage;
camping on the first cell of the first network when the mobility of the electronic device satisfies a preset mobility condition; and
camping on a second cell of a second network when the mobility of the electronic device fails to satisfy the preset mobility condition, the second network being the other one of the wireless service provider networks.

9. The method of claim 8, wherein
the camping on the first cell of the first network when the mobility of the electronic device satisfies the preset mobility condition further comprises:
camping on the first cell of the first network when a first speed of the electronic device is larger than or equal to a speed threshold; and
the camping on the second cell of the second network when the mobility of the electronic device fails to satisfy the preset mobility condition further comprises:
camping on the second cell of the second network when a second speed of the electronic device is less than the speed threshold, the second speed of the electronic device being less than the first speed of the electronic device.

10. The method of claim 8, further comprising:
determining characteristics of the first cell based on the signals, the characteristics including one or a combination of: reference signal received power, reference signal received quality, a carrier frequency, and a radio access technology; and
camping on the first cell when the mobility of the electronic device and the characteristics satisfy a preset selection condition.

11. The method of claim 8, wherein the detecting that the other one of the wireless service provider networks is for the normal public usage further comprises:
detecting a normal public signature indicating that the other one of the wireless service provider networks is for the normal public usage; or
detecting a default network type indicating that the other one of the wireless service provider networks is for the normal public usage, the default network type corresponding to a lack of the HSR signature.

12. The method of claim 6, further comprising:
obtaining an association between the RRHs and a cell in the wireless service provider networks.

13. The method of claim 6, further comprising:
receiving a radio resource management (RRM) measurement configuration from the wireless service provider networks;
conducting measurements including the mobility of the electronic device based on the RRM measurement configuration; and
sending a RRM measurement report including the mobility of the electronic device to the wireless service provider networks.

14. The method of claim 6, wherein the receiving the signals from wireless service provider networks further comprises:
receiving, from the first cell, system information including the HSR signature of the first cell, the system information being of the first cell.

15. The method of claim 14, wherein the receiving the system information including the HSR signature further comprises:
receiving, from the first cell, the system information including the HSR signature of the first cell and HSR signatures of neighboring cells of the first cell.

16. A method, comprising:
receiving, by an apparatus of a serving cell in a wireless service provider network that serves an electronic device, first signals from the electronic device;
detecting a high speed rail (HSR) signature of a neighboring cell;

determining a mobility of the electronic device;

selectively initializing an handover of the electronic device from the serving cell to the neighboring cell based on the mobility of the electronic device; and transmitting, by the apparatus; a signal including remote radio head (RRH) information.

17. The method of claim 16, further comprising:

receiving, from the neighboring cell, second signals carrying the HSR signature of the neighboring cell.

18. The method of claim 16, further comprising:

transmitting, by the apparatus, system information that includes an HSR signature for the serving cell.

19. The method of claim 16, further comprising:

detecting at least one of a reference signal received power (RSRP), a reference signal received quality (RSRQ), a carrier frequency, and a radio access technology of the neighboring cell; and selectively initializing the handover of the electronic device from the serving cell to the neighboring cell based on the mobility of the electronic device and the at least one of the RSRP, the RSRQ, the carrier frequency, and the radio access technology of the neighboring cell.

20. The method of claim 16, further comprising:

receiving the mobility of the electronic device from the electronic device.

21. The method of claim 18, wherein the transmitting the system information that includes the HSR signature for the serving cell further comprises:

transmitting, by the apparatus, the system information that includes the HSR signature for the serving cell and respective HSR signatures of neighboring cells.

* * * * *